United States Patent
Liu et al.

(10) Patent No.: US 10,491,360 B2
(45) Date of Patent: Nov. 26, 2019

(54) WIRELESS COMMUNICATION DEVICE AND CONTROL METHOD

(71) Applicant: REALTEK SEMICONDUCTOR CORP., Hsinchu (TW)

(72) Inventors: Der-Zheng Liu, Hsinchu County (TW); Ming-Yuh Yeh, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/943,134

(22) Filed: Apr. 2, 2018

(65) Prior Publication Data

US 2019/0013923 A1    Jan. 10, 2019

(30) Foreign Application Priority Data

Jul. 10, 2017  (TW) .............................. 106122983 A (51) Int. Cl.
*H04L 5/14*     (2006.01)
*H04B 15/00*    (2006.01)
(Continued)

(52) U.S. Cl.
CPC .............. *H04L 5/14* (2013.01); *H04B 1/123* (2013.01); *H04B 1/525* (2013.01); *H04B 15/00* (2013.01); *H04W 88/06* (2013.01)

(58) Field of Classification Search
CPC ..... H04L 49/1523; H04L 5/1423; H04L 5/16; H04L 25/22; H04L 5/08; H04L 5/06;
(Continued)

(56) References Cited

U.S. PATENT DOCUMENTS

| 9,036,749 B2* | 5/2015 | Choi ....................... H04L 5/143 |
| | | 375/346 |
| 2003/0031279 A1* | 2/2003 | Blount .................. H04B 1/525 |
| | | 375/346 |

(Continued)

FOREIGN PATENT DOCUMENTS

| CN | 106471745 | 3/2017 |
| WO | 2016005797 | 1/2016 |

OTHER PUBLICATIONS

Dinesh Bharadia, "Full Duplex Radios" SIGCOMM '13 Proceedings of the ACM SIGCOMM 2013 conference on SIGCOMM, pp. 375-386 Hong Kong, China—Aug. 12-16, 2013; ACM SIGCOMM Computer Communication Review, vol. 43 Issue 4, Oct. 2013, pp. 375-386.

*Primary Examiner* — Brenda H Pham
(74) *Attorney, Agent, or Firm* — WPAT, PC (57) ABSTRACT

The present invention discloses a wireless communication device including: a transmission circuit generating a digital modulation signal according to transmission data, and analogizing the digital modulation signal to generate and transmit a transmission signal in a first mode; a reception circuit receiving a reception signal including an interference component caused by the transmission circuit; a self-interference cancellation circuit being enabled in the first mode and disabled in a second mode, providing an analog self-interference cancellation signal for the wireless reception circuit according to the transmission signal to cancel a part of the interference component, and providing a digital self-interference cancellation signal for the reception circuit according to the digital modulation signal to cancel another part of the interference component; and a control circuit having the wireless communication device operate in one of the first mode and the second mode according to at least one of indices and parameters.

13 Claims, 5 Drawing Sheets

(51) Int. Cl.
*H04B 1/12* (2006.01)
*H04B 1/525* (2015.01)
*H04W 88/06* (2009.01)

(58) Field of Classification Search
CPC . H04B 3/23; H04B 3/20; H04B 3/234; H04B 3/237; H04B 3/235; H04B 3/231
USPC ....... 370/376, 282, 287, 289, 290, 293, 296, 370/297
See application file for complete search history.

(56) References Cited

U.S. PATENT DOCUMENTS

| | | | |
|---|---|---|---|
| 2008/0008126 A1* | 1/2008 | Shirakabe | H04B 7/2615 370/329 |
| 2009/0190633 A1 | 7/2009 | Smith | |
| 2009/0213765 A1 | 8/2009 | Rinne et al. | |
| 2009/0296609 A1 | 12/2009 | Choi et al. | |
| 2013/0229952 A1* | 9/2013 | Koskinen | H04L 5/16 370/278 |
| 2014/0126437 A1* | 5/2014 | Patil | H04B 7/0486 370/310 |
| 2014/0348018 A1* | 11/2014 | Bharadia | H04L 5/1461 370/252 |
| 2015/0049834 A1 | 2/2015 | Choi et al. | |
| 2015/0372801 A1* | 12/2015 | Smee | H04L 5/16 370/296 |
| 2016/0183105 A1* | 6/2016 | Jiang | H04L 1/20 370/296 |
| 2016/0294532 A1* | 10/2016 | Masmoudi | H04B 15/005 |
| 2016/0380746 A1* | 12/2016 | Min | H04L 5/16 370/277 |
| 2017/0005773 A1* | 1/2017 | Liu | H04B 1/525 |
| 2019/0052450 A1* | 2/2019 | Fodor | H04W 72/082 |

\* cited by examiner

WIRELESS COMMUNICATION DEVICE AND CONTROL METHOD

BACKGROUND OF THE INVENTION

1. Field of the Invention

The present invention relates to a wireless communication device and a control method, especially to a wireless communication device and a control method capable of executing self-interference cancellation.

2. Description of Related Art

In the field of communication, a half-duplex mode allows two communication devices to carry out bidirectional transmission through the same channel, but forbids the two communication devices to carry out transmission at the same time; in other words, the half-duplex mode only allows one communication device to transmit data and another communication device to receive the data at the same time. On the other hand, a full-duplex mode allows each of two communication devices to carry out transmission and reception at the same time. In light of the above, the throughput of the full-duplex mode doubles that of the half-duplex mode in theory. Therefore, some wired communication standard (e.g., IEEE 802.3) has adopted a full-duplex mode for wired communication. However, wireless communication standards (e.g., IEEE 802.11) still use a half-duplex mode for wireless communication, and one reason for the hesitation of using a full-duplex mode is the problem of interference, especially the problem of a transmission operation of one wireless device interfering with a reception operation of the same wireless device. This kind of problem is named "self-interference".

Although some research indicates that wireless communication in a full-duplex mode is workable, in consideration of the problem of self-interference, the transmission performance in a full-duplex mode may, no unlikely, be worse than the transmission performance in a half-duplex mode. Accordingly, properly choosing one of a full-duplex mode and a half-duplex mode for communication is a difficult problem in the field of wireless communication.

SUMMARY OF THE INVENTION

An object of the present invention is to provide a wireless communication device and a control method capable of adaptively operating in one of a full-duplex mode and a half-duplex mode to carry out communication.

The present invention discloses a wireless communication device capable of adaptively operating in one of a first mode (e.g., full-duplex mode) and a second mode (e.g., half-duplex mode). An embodiment of the wireless communication device includes a wireless transmission circuit, a wireless reception circuit, a self-interference cancellation circuit, and a control circuit. The wireless transmission circuit is configured to receive transmission data, generate a digital modulation signal according to the transmission data, and analogize the digital modulation signal to generate and transmit a transmission signal in one of the first mode and the second mode. The wireless reception circuit is configured to receive a reception signal in one of the first mode and the second mode, wherein the reception signal includes a self-interference component caused by the wireless transmission circuit when the wireless transmission circuit operates in the first mode. The self-interference cancellation circuit is configured to be enabled in the first mode and disabled in the second mode, and an embodiment of the self-interference cancellation circuit includes: an analog self-interference cancellation circuit configured to provide an analog self-interference cancellation signal for the wireless reception circuit according to the transmission signal so as to allow the wireless reception circuit to cancel a first part of the interference component according to the analog self-interference cancellation signal; and a digital self-interference cancellation circuit configured to provide a digital self-interference cancellation signal for the wireless reception circuit according to the digital modulation signal so as to allow the wireless reception circuit to cancel a second part of the interference component according to the digital self-interference cancellation signal. The control circuit is configured to have the wireless communication device operate in one of the first mode and the second mode according to at least one of a self-interference index, an environment interference index, an operation-capability parameter, and a power-saving demand parameter; or have the wireless communication device operate in one of the first mode and the second mode according to at least one of a distance index, an interference-amount index, and a communication quality index.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

In an early stage of two wireless communication devices establishing connection, the two wireless communication devices execute a negotiation procedure. In this negotiation procedure, each of the two wireless communication devices is informed of the mode(s) operable for the other side. After being informed of the mode(s), the two wireless communication devices choose a better one of the mode(s) for communication. Of course when the two wireless communication devices are operable in a full-duplex mode, both of them can communicate in the full-duplex mode. In theory, the throughput of a full-duplex mode is the double of the throughput of a half-duplex mode. Therefore, when the two wireless communication devices are operable in the full-duplex mode, the full-duplex mode will be used preferentially for communication. However, in consideration of the problem of interference, the full-duplex mode may, not unlikely, be the worse choice for the two wireless communication devices.

In order to properly choose one of a full-duplex mode and a half-duplex mode for wireless communication, the present invention discloses a wireless communication device capable of adaptively operating in one of a first mode (e.g., a full-duplex mode, a homogeneous communication demand mode, or a heterogeneous communication demand mode) with the need to do self-interference cancellation and a second mode (e.g., a half-duplex mode) without the need to do self-interference cancellation.

Figure 1:
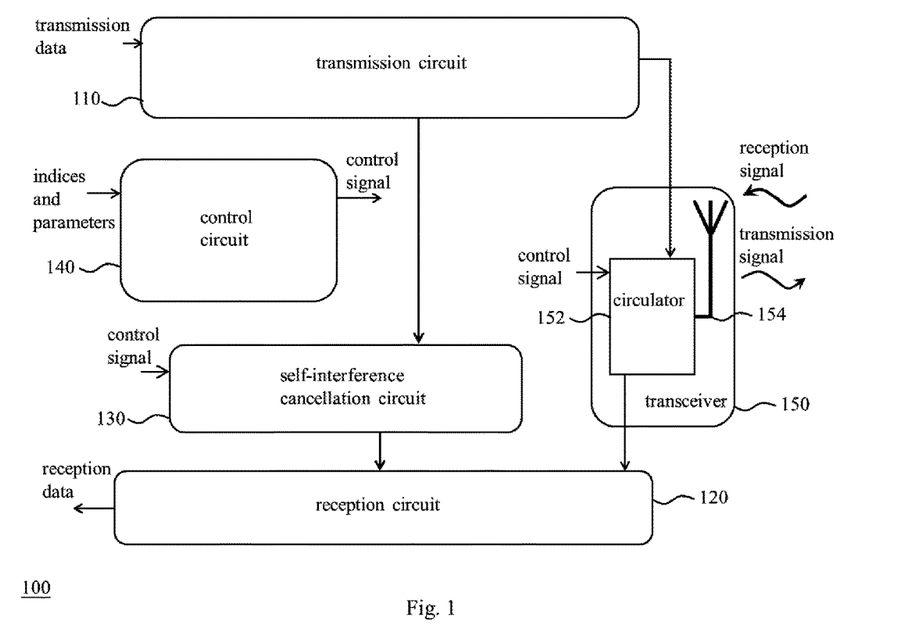
FIG. 1 shows the wireless communication device according to an embodiment of the present invention.

FIG. 1 shows the wireless communication device according to an embodiment of the present invention. The wireless communication device 100 of FIG. 1 includes a wireless transmission circuit 110, a wireless reception circuit 120, a self-interference cancellation circuit 130, a control circuit 140, and a transceiver 150. The wireless transmission circuit 110 is configured to carry out transmission in the aforementioned first and/or second mode. In the first mode, the wireless transmission circuit 110 receives transmission data, modulates the transmission data to generate a digital modulation signal, and analogizes the digital modulation signal to generate and transmit a transmission signal. The wireless reception circuit 120 is configured to carry out reception in the first or second mode. In the first mode, the wireless reception circuit 120 receives a reception signal and determines that the reception signal includes an interference component originated from the transmission signal. The self-interference cancellation circuit 130 is enabled in the first mode and disabled in the second mode. The self-interference cancellation circuit 130 is configured to provide an analog self-interference cancellation signal for the wireless reception circuit 120 according to the transmission signal, so as to allow the wireless reception circuit 120 to cancel a part of the interference component of the reception signal according to the analog self-interference cancellation signal; and the self-interference cancellation circuit 130 is further configured to provide a digital self-interference cancellation signal for the wireless reception circuit 120 according to the digital modulation signal, so as to allow the wireless reception circuit 120 to cancel another part (e.g., the remaining part) of the interference component of the reception signal according to the digital self-interference cancellation signal. The control circuit 140 is configured to generate a control signal according to at least one of the following indices and parameters for having the wireless communication device 100 operate in one of the first mode and the second mode: a self-interference index, an environment interference index, an operation-capability parameter, and a power-saving demand parameter. The transceiver 150 is configured to carry out transmission and reception in the first mode or the second mode according to the control signal of the control circuit 140. The transceiver 150 usually includes a radio-frequency (RF) circulator 152 and an antenna 154.

In this embodiment, the first mode is an operation mode (e.g., a full-duplex mode, a homogeneous communication demand mode, or a heterogeneous communication demand mode) having the need to carry out self-interference cancellation, while the second mode is an operation mode (e.g., a half-duplex mode; meanwhile the homogeneous communication demand mode and the heterogeneous communication demand mode are absent) having no need to carry out self-interference cancellation. For a better understanding, in the following description the first mode is a full-duplex mode and the second mode is a half-duplex mode, and this is just exemplary for understanding. The so-called full-duplex mode is that the wireless transmission circuit 110 and the wireless reception circuit 120 operate concurrently while the transmission signal and the reception signal exist in the same channel at the same time (i.e., the central frequency of a carrier of the transmission signal is substantially identical to the central frequency of a carrier of the reception signal). The so-called half-duplex mode is that the wireless transmission circuit 110 and the wireless reception circuit 120 do not use the same channel at the same time to operate, or the transmission signal and the reception signal exist in different channels at the same time (i.e., the transmission signal and the reception signal are sent through the different channels respectively). The so-called homogeneous communication demand mode is that the transmission signal and the reception signal are sent through adjacent channels according to the same or an associated communication protocol; for instance, the said adjacent channels are channels defined by IEEE 802.11. The so-called heterogeneous communication demand mode is that the transmission signal and the reception signal are sent through fully or partially overlapped channels or through adjacent channels according to different communication protocols. In an exemplary implementation, when the wireless reception circuit 120 (e.g., WIFI transmission circuit) and another wireless transmission circuit (e.g., Bluetooth transmission circuit) operate currently, if the control circuit 140 has the wireless communication device 100 operate in the first mode, the self-interference cancellation circuit 130 provides at least one self-interference cancellation signal for the wireless reception circuit 120 according to transmission data of the other wireless transmission circuit (e.g., Bluetooth transmission circuit), so as to allow the wireless reception circuit 120 to cancel at least a part of an interference component (originated from a transmission signal of the transmission data of the other wireless transmission circuit) included in the reception signal according to the at least one self-interference cancellation signal.

The aforementioned self-interference index indicates whether a difference between a carrier central frequency associated with the transmission signal and a carrier central frequency associated with the reception signal is within a predetermined range; in other words, the self-interference index indicates whether the transmission signal and the reception signal are sent through a substantially same channel or through adjacent channels. For instance, when the self-interference index indicates that the absolute value of the difference between the two carrier central frequencies is less than a threshold value, the control circuit 140 has the wireless communication device 100 operate in the first mode and enables the self-interference cancellation circuit 130; when the absolute value of the difference is greater than the threshold value, the control circuit 140 has the wireless communication device 100 operate in the second mode and disables the self-interference cancellation circuit 130, in which an example of the threshold value is a value between 0 and tens of megahertz (e.g., 22 MHz). The control circuit 140 can be configured to determine the self-interference index according to the operation setting of the transmission circuit 110 and the reception circuit 120.

The aforementioned environment interference index includes at least one of the following indices: a received signal strength index (RSSI) of a non-intended connection partner, in which an example of the RSSI of the non-intended connection partner could be the maximum one of the RSSIs of several non-intended connection partners using the same channel and/or adjacent channels; a power spectrum density (PSD); a time difference between the time the wireless transmission circuit 110 transmitting a packet and the time the wireless transmission circuit 110 receiving an acknowledgement signal associated with the packet, in which the time difference can be used to measure a distance between the wireless transmission circuit 110 and its connection partner; an amount of service set identifier (SSID);

a retransmit count of the transmission signal; an error rate (e.g., bit error rate (BER)) of the reception signal; a transmission speed of the transmission signal and/or the reception signal, i.e., the throughput in a unit of time, which reflects the transmission throughput and/or the reception throughput in a period of time; and a coding manner (e.g., modulation and coding scheme (MCS)) of the transmission signal and/or the reception signal. People of ordinary skill in the art can have the wireless communication device 100 obtain the above-mentioned RSSI, PSD, time difference, amount of SSID, retransmit count, error rate, transmission speed (throughput), MCS, etc. by using the existing techniques.

Based on the above description, the control circuit 140 can further determine that the interference is more critical when at least one of the following conditions is satisfied: the RSSI of the non-intended connection partner getting stronger; the time difference getting shorter, which indicates that the distance between the wireless transmission circuit 110 and its connection partner is shorter and severer interference is expected; the amount of SSID (that is related to the amount of access point (AP) in the vicinity) getting more, which indicates that there are many APs in the vicinity capable of causing interference; the retransmit count getting more; the error rate getting higher; the transmission speed getting lower; and the transmission speed associated with the coding manner (e.g., MCS) of the transmission signal/the reception signal getting lower. In the above-mentioned conditions, when the interference is determined to be severe or get worse, the control circuit 140 is inclined to use the half-duplex mode; however, this inclination is exemplary for understanding rather than restriction on the implementation of the present invention.

The aforementioned operation-capability parameter indicates whether both the wireless communication device 100 and the connection partner thereof are capable of operating in the first mode, in which the wireless communication device 100 can acquire the operation-capability parameter through the aforementioned negotiation procedure or a known/self-defined probing procedure. For instance, if the connection partner is not capable of operating in the first mode, the control circuit 140 has the wireless communication device 100 operate in the second mode.

For another instance, when the wireless communication device 100 is a wireless access point (AP) and its connection partner is a wireless station (STA), if both the wireless communication device 100 and its connection partner are capable of operating in the first mode, the control circuit 140 has the wireless communication device 100 operate in the first mode, or has the wireless communication device 100 operate in one of the first mode and the second mode further according to at least one of the other indices and parameters. Afterwards, the control circuit 140 notifies the connection partner of using the first mode or the second mode for communication.

For a further instance, when the wireless communication device 100 is a wireless station (STA) and its connection partner is an AP, if both the wireless communication device 100 and its connection partner are capable of operating in the first mode but the connection partner asks for operating in the second mode, the control circuit 140 has the wireless communication device 100 operate in the second mode. For a further instance, if the connection partner asks for operating in the first mode, the control circuit 140 has the wireless communication device 100 operate in the first mode.

The aforementioned power-saving demand parameter indicates whether any of the wireless communication device 100 and the connection partner thereof asks for a power-saving operation (a.k.a. low power-consumption operation). For instance, if any of the wireless communication device 100 and its connection partner asks for the power-saving operation, the control circuit 140 has the wireless communication device 100 operate in the second mode. For another instance, if none of the wireless communication device 100 and its connection partner asks for the power-saving operation, the control circuit 140 has the wireless communication device 100 operate in the first mode, or has the wireless communication device 100 operate in the first mode or the second mode further according to at least one of the other indices and parameters.

Figure 2:
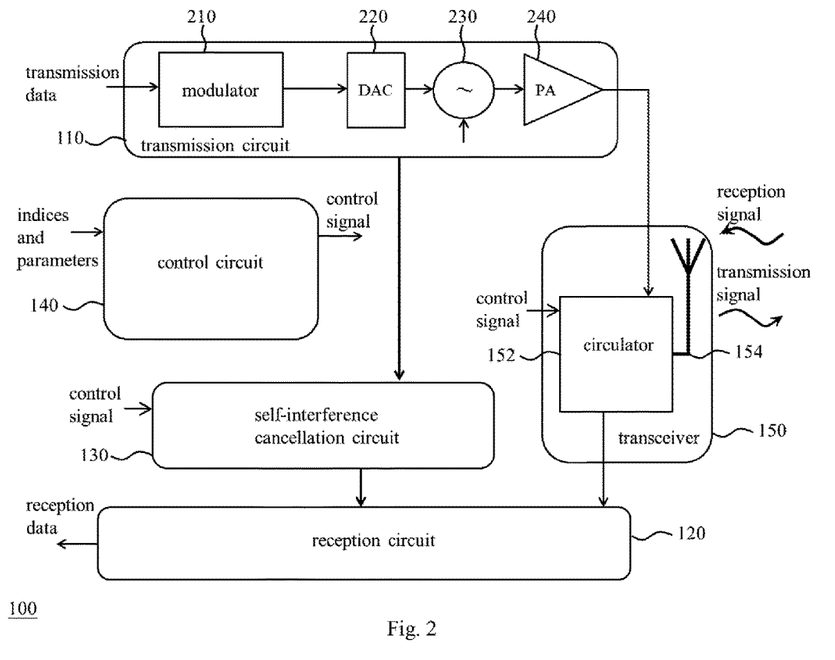
FIG. 2 shows an embodiment of the wireless transmission circuit of FIG. 1.

FIG. 2 shows an embodiment of the wireless transmission circuit 110. As shown in FIG. 2, the wireless transmission circuit 110 includes a modulator 210, a digital-to-analog converter (DAC) 220, an up-conversion mixer 230 receiving a reference clock (as indicated by the upward arrow connected to the mixer 230 in FIG. 2), and a power amplifier (PA) 240. An embodiment of the modulator 210 includes a mapper (QAM/PSK decoder) and an Inverse Fast Fourier Transform (IFFT) circuit. Since the wireless transmission circuit 100 alone is known in this industrial field, its detail is omitted here.

Figure 3:
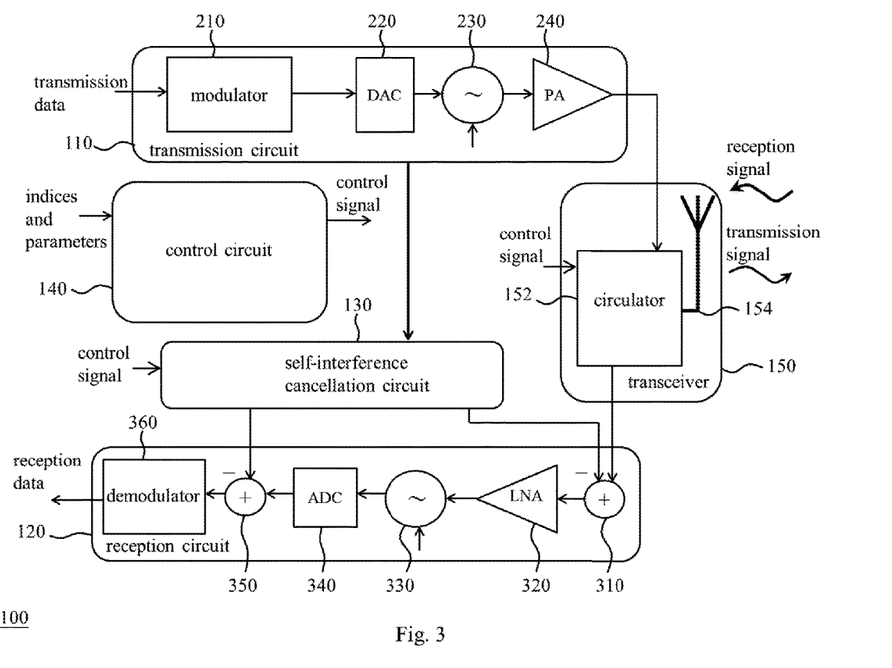
FIG. 3 shows an embodiment of the wireless reception circuit of FIG. 1.

FIG. 3 shows an embodiment of the wireless reception circuit 120. As shown in FIG. 3, the wireless reception circuit 120 includes: at least one of an analog self-interference canceller 310 and a digital self-interference canceller 350; a low noise amplifier (LNA) 320; a down-conversion mixer 330 receiving a reference clock (as indicated by the upward arrow connected to the mixer 330 in FIG. 2); an analog-to-digital converter (ADC) 340; and a demodulator 360. An embodiment of the said analog self-interference canceller 310 is a subtraction circuit or the equivalent thereof, capable of subtracting an analog self-interference cancellation signal of the aforementioned self-interference cancellation signal from the aforementioned reception signal. An embodiment of the said digital self-interference canceller 350 is a subtraction circuit or the equivalent thereof, capable of subtracting a digital self-interference cancellation signal of the self-interference cancellation signal from a digital reception signal outputted by the ADC 340. In addition, each of the said LNA 320, the down-conversion mixer 330, the ADC 340, and the demodulator 360 alone is known in this industrial field, and their detail is omitted here.

Figure 4:
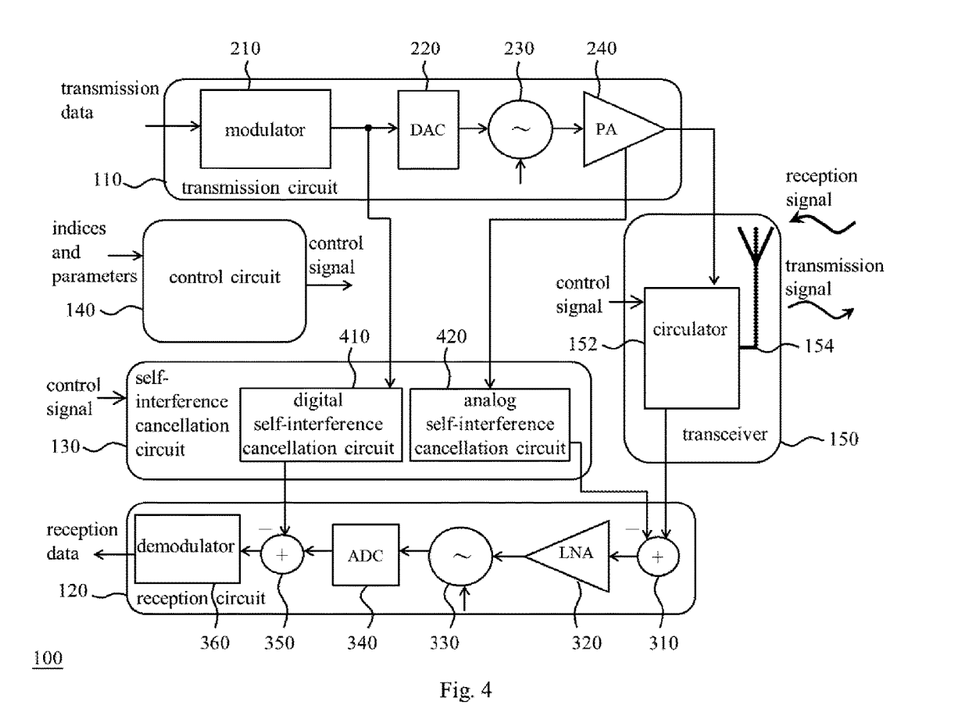
FIG. 4 shows an embodiment of the self-interference cancellation circuit of FIG. 1.

FIG. 4 shows an embodiment of the self-interference cancellation circuit 130. As shown in FIG. 4, the self-interference cancellation circuit 130 includes a digital self-interference cancellation circuit 410 and an analog self-interference cancellation circuit 420. Since the pattern of the aforementioned transmission data and how the transmission data is processed during the transmission procedure are known to the wireless communication device 100, the digital self-interference cancellation circuit 410 is operable to estimate the distortion according to the output signal of the aforementioned modulator 210 and then generate the aforementioned digital self-interference cancellation signal which is approximated to the a second part (e.g., remaining part) of the aforementioned interference component of the reception signal; and the analog self-interference cancellation circuit 420 is operable to do estimation according to the output of the aforementioned PA 240 and then generate the aforementioned analog self-interference cancellation signal which is approximated to a first part of the interference component of the reception signal. An embodiment of the digital self-interference cancellation circuit 410 is a non-linear digital filter; an embodiment of the analog self-interference cancellation circuit 420 is composed of a plurality of combined circuits connected in parallel, in which each combined circuit includes a delay unit and an adjustable attenuator connected in series. Other embodiments of the self-interference cancellation circuit 130 can be realized in accordance with the existing techniques.

Figure 5:
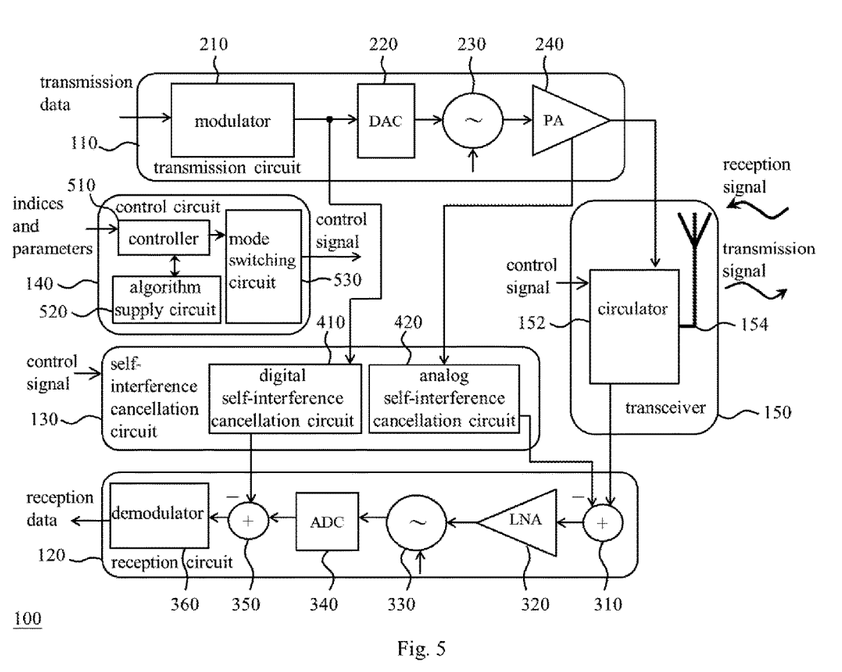
FIG. 5 shows an embodiment of the control circuit of FIG. 1.

FIG. 5 shows an embodiment of the control circuit 140. As shown in FIG. 5, the control circuit 140 includes a controller 510, an algorithm supply circuit 520, and a mode switching circuit 530. In detail, the controller 510 receives at least one of the aforementioned indices and parameters and uses at least one of the received index(es) and parameter(s) according to a predetermined algorithm from the algorithm supply circuit 520, so as to has the mode switching circuit 530 generate the aforementioned control signal. An instance of the said predetermined algorithm is an algorithm assigning the indices and parameters different priorities and/or weightings respectively, and the priorities and/or weightings can be set/adjusted by those of ordinary skill in the art according to their demand or the performance on the instant. Another instance of the predetermined algorithm is an algorithm analyzing/processing at least one of the indices and parameters.

Based on the above, for instance, an embodiment of the predetermined algorithm includes the following steps: establishing at least one distance index which can be obtained according to at least one of the aforementioned environment interference index(es) (e.g., the degree of RSSI, the time difference, . . . ); comparing the distance index with a distance threshold to generate a comparison result; when the comparison result indicates that the distance index is not less than the distance threshold, having the wireless communication device 100 operate in the first mode; and when the comparison result indicates that the distance index is less than the distance threshold, having the wireless communication device 100 operate in the second mode. For another instance, an embodiment of the predetermined algorithm includes the following steps: establishing an interference-amount index which can be obtained according to at least one of the aforementioned environment interference index(es) (e.g., the amount of SSID, PSD, . . . ); comparing the interference-amount index with an amount threshold to generate a comparison result; when the comparison result indicates that the interference-amount index is less than the amount threshold, having the wireless communication device 100 operate in the first mode; and when the comparison result indicates that the interference-amount index is not less than the amount threshold, having the wireless communication device 100 operate in the second mode. For a further instance, an embodiment of the predetermined algorithm has the wireless communication device 100 operate in the first mode or the second mode according to both of the above-mentioned distance index(es) and the interference-amount index(es). For a further instance, in consideration of that the cause of bad communication quality (e.g., high retransmit count, high error rate, low transmission speed (i.e., low data throughput in a unit of time)) is usually related to severe interference, an embodiment of the predetermined algorithm includes the following steps: establishing a communication quality index which can be obtained according to at least one of the aforementioned index(es) (e.g., retransmit count, error rate, transmission speed, . . . ); comparing the communication quality index with a quality threshold to generate a comparison result; when the comparison result indicates that the communication quality index is greater than the quality threshold, having the wireless communication device 100 operate in the first mode; and when the comparison result indicates that the communication quality index is not greater than the quality threshold, having the wireless communication device 100 operate in the second mode.

Based on the above, for instance, an embodiment of the predetermined algorithm includes the following steps: having the wireless communication device 100 operate in the first mode and then measuring at least one of the aforementioned environment interference index(es) (e.g., transmission speed, reception speed, . . . ) to obtain a first result; having the wireless communication device 100 operate in the second mode and then measuring at least one of the environment interference index(es) (e.g., transmission speed, reception speed, . . . ) to obtain a second result; comparing the first result with the second result and accordingly determining which of the first mode and the second mode brings better performance (e.g., higher throughput), so as to have the wireless communication device 100 operate in the mode of better performance. For another instance, an embodiment of the predetermined algorithm includes not only the steps of the above instance, but also the following steps: after having the wireless communication device 100 operate in the mode of better performance, keeping measuring at least one of the environment interference index(es) (e.g., transmission speed, reception speed, . . . ) to obtain an update result; when the update result indicates that the performance degrades and becomes worse than a threshold, regenerating the first result and the second result and determining which of the first mode and the second mode brings better performance again.

It should be noted that the way to carry out the present invention can be flexible. More specifically, if an implementation of the present invention is practicable, people of ordinary skill in the art can selectively make use of some or all of the features of any of the aforementioned embodiments or make use some or all of the features of several of the embodiments to have the implementation come true.

The present invention also discloses a control method for controlling a wireless communication device to adaptively operate in one of a full-duplex mode and a half-duplex mode. An embodiment of the control method includes the following steps: generating, in a wireless transmission circuit of the wireless communication device, a digital modulation signal according to transmission data in one of the full-duplex mode and the half-duplex mode; analogizing, in the wireless transmission circuit, the digital modulation signal to generate and transmit a transmission signal in one of the full-duplex mode and the half-duplex mode; receiving, in a wireless reception circuit of the wireless communication device, a reception signal in one of the first full-duplex mode and the half-duplex mode, wherein the reception signal includes a self-interference component caused by the wireless transmission circuit when the wireless transmission circuit operates in the full-duplex mode; and enabling or disabling a self-interference cancellation mechanism of the wireless reception circuit according to the wireless communication device operating in the full-duplex mode or the half-duplex mode. Furthermore, this embodiment may optionally include at least one of the following steps: determining the wireless communication device to operate in the full-duplex mode or the half-duplex mode according to an operation-capability parameter; determining the wireless communication device to operate in the full-duplex mode or the half-duplex mode according to at least one of a self-interference index, an environment interference index and a power-saving demand parameter; and determining the wireless communication device to operate in the full-duplex mode or the half-duplex mode according to at least one of a distance index, an interference-amount index and a communication quality index. In addition, an instance of the above-mentioned self-interference cancellation mechanism includes: providing an analog self-interference cancellation signal for the wireless reception circuit according to the transmission signal so as to allow the wireless reception circuit to cancel a first part of the interference component according to the analog self-interference cancellation signal; and providing a digital self-interference cancellation signal for the wireless reception circuit according to the digital modulation signal so as to allow the wireless reception circuit to cancel a second part of the interference component according to the digital self-interference cancellation signal.

To sum up, the present invention is capable of adaptively operating in one of a first mode (e.g., full-duplex mode) with the need to do self-interference cancellation and a second mode (e.g., half-duplex mode) without the need to do self-interference cancellation, and thereby increases/ensures transmission performance.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A wireless communication device capable of adaptively operating in one of a first mode and a second mode, the wireless communication device comprising:
   a wireless transmission circuit configured to receive transmission data, generate a digital modulation signal according to the transmission data, and analogize the digital modulation signal to generate and transmit a transmission signal in one of the first mode and the second mode;
   a wireless reception circuit configured to receive a reception signal in one of the first mode and the second mode, wherein the reception signal includes a self-interference component caused by the wireless transmission circuit when the wireless transmission circuit operates in the first mode;
   a self-interference cancellation circuit configured to be enabled in the first mode and disabled in the second mode, the self-interference cancellation circuit comprising:
      an analog self-interference cancellation circuit configured to provide an analog self-interference cancellation signal for the wireless reception circuit according to the transmission signal so as to allow the wireless reception circuit to cancel a first part of the interference component according to the analog self-interference cancellation signal; and
      a digital self-interference cancellation circuit configured to provide a digital self-interference cancellation signal for the wireless reception circuit according to the digital modulation signal so as to allow the wireless reception circuit to cancel a second part of the interference component according to the digital self-interference cancellation signal; and
   a control circuit configured to have the wireless communication device operate in one of the first mode and the second mode according to at least one of following indices and parameters: a self-interference index indicating whether a difference between a carrier central frequency associated with the transmission signal and a carrier central frequency associated with the reception signal is within a predetermined range; an environment interference index; and a power-saving demand parameter,
   wherein the environment interference index indicates at least one of following: power spectrum density (PSD); a time difference between the time the wireless transmission circuit transmitting a packet and the time the wireless transmission circuit receiving an acknowledgement signal associated with the packet; an amount of service set identifier (SSID); a retransmit count of the transmission signal; an error rate of the reception signal; and a transmission speed of the transmission signal and/or the reception signal.

2. The wireless communication device of claim 1, wherein the first mode is a full-duplex mode, and the second mode is a half-duplex mode.

3. The wireless communication device of claim 1, wherein the first mode is one of a homogeneous communication demand mode and a heterogeneous communication demand mode.

4. The wireless communication device of claim 1, wherein when the first mode is a heterogeneous communication demand mode, the wireless transmission circuit and the wireless reception circuit operate in accordance with different communication protocols respectively.

5. The wireless communication device of claim 1, wherein when the first mode is a homogeneous communication demand mode, the wireless transmission circuit and the wireless reception circuit operate in accordance with a same or an associated communication protocol, and a difference between carrier central frequencies of the transmission signal and the reception signal is within a predetermined range.

6. The wireless communication device of claim 1, wherein the control circuit uses at least one of the indices and parameters according to a predetermined algorithm.

7. A wireless communication device capable of adaptively operating in one of a first mode and a second mode, the wireless communication device comprising:
   a wireless transmission circuit configured to receive transmission data, generate a digital modulation signal according to the transmission data, and analogize the digital modulation signal to generate and transmit a transmission signal in one of the first mode and the second mode;
   a wireless reception circuit configured to receive a reception signal in one of the first mode and the second mode, wherein the reception signal includes a self-interference component caused by the wireless transmission circuit when the wireless transmission circuit operates in the first mode;
   a self-interference cancellation circuit configured to be enabled in the first mode and disabled in the second mode, the self-interference cancellation circuit comprising:
      an analog self-interference cancellation circuit configured to provide an analog self-interference cancellation signal for the wireless reception circuit according to the transmission signal so as to allow the wireless reception circuit to cancel a first part of the interference component according to the analog self-interference cancellation signal; and
      a digital self-interference cancellation circuit configured to provide a digital self-interference cancellation signal for the wireless reception circuit according to the digital modulation signal so as to allow the wireless reception circuit to cancel a second part of the interference component according to the digital self-interference cancellation signal; and a control circuit configured to have the wireless communication device operate in one of the first mode and the second mode according to at least one of following indices: a distance index indicating a time difference between a time the wireless transmission circuit transmitting a packet and a time the wireless transmission circuit receiving an acknowledgement signal associated with the packet; an interference-amount index; and a communication quality index indicating at least one of a retransmit count of the transmission signal, an error rate of the reception signal, and a transmission speed of the transmission signal and/or the reception signal.

8. The wireless communication device of claim 7, wherein the first mode is a full-duplex mode and the second mode is a half-duplex mode.

9. The wireless communication device of claim 7, wherein the interference-amount index indicates at least one of power spectrum density (PSD) and an amount of service set identifier (SSID).

10. A control method for controlling a wireless communication device to adaptively operate in one of a heterogeneous communication demand mode and a half-duplex mode, the control method comprising:

generating, in a wireless transmission circuit of the wireless communication device, a digital modulation signal according to transmission data in one of the heterogeneous communication demand mode and the half-duplex mode;

analogizing, in the wireless transmission circuit, the digital modulation signal to generate and transmit a transmission signal in one of the heterogeneous communication demand mode and the half-duplex mode;

receiving, in a wireless reception circuit of the wireless communication device, a reception signal in one of the first heterogeneous communication demand mode and the half-duplex mode, wherein the reception signal includes a self-interference component caused by the wireless transmission circuit when the wireless transmission circuit operates in the heterogeneous communication demand mode; and enabling or disabling a self-interference cancellation mechanism of the wireless reception circuit according to the wireless communication device operating in the heterogeneous communication demand mode or the half-duplex mode, wherein when the control method controls the wireless communication device to operate in the heterogeneous communication demand mode, the transmission signal is generated in accordance with a communication protocol determining the wireless communication device to operate in the heterogeneous communication demand mode or the half-duplex mode according to an operation-capability parameter and the reception signal is received in accordance with another communication protocol.

11. The control method of claim 10, further comprising:
determining the wireless communication device to operate in the heterogeneous communication demand mode or the half-duplex mode according to at least one of following: a self-interference index; an environment interference index; and a power-saving demand parameter.

12. The control method of claim 10, further comprising:
determining the wireless communication device to operate in the heterogeneous communication demand mode or the half-duplex mode according to at least one of following: a distance index; an interference-amount index; and a communication quality index.

13. The control method of claim 10, wherein the self-interference cancellation mechanism comprises:
providing an analog self-interference cancellation signal for the wireless reception circuit according to the transmission signal so as to allow the wireless reception circuit to cancel a first part of the interference component according to the analog self-interference cancellation signal; and providing a digital self-interference cancellation signal for the wireless reception circuit according to the digital modulation signal so as to allow the wireless reception circuit to cancel a second part of the interference component according to the digital self-interference cancellation signal.

* * * * *